United States Patent [19]
Busche

[11] Patent Number: 5,805,593
[45] Date of Patent: Sep. 8, 1998

[54] ROUTING METHOD FOR SETTING UP A SERVICE BETWEEN AN ORIGINATION NODE AND A DESTINATION NODE IN A CONNECTION-COMMUNICATIONS NETWORK

[75] Inventor: Matthew T. Busche, Freehold, N.J.

[73] Assignee: AT&T Corp, Middletown, N.J.

[21] Appl. No.: 534,151

[22] Filed: Sep. 26, 1995

[51] Int. Cl.⁶ .................................................... H04J 3/24
[52] U.S. Cl. ........................ 370/396; 370/406; 370/409; 370/238
[58] Field of Search .................................. 370/238, 254, 370/255, 397, 400, 406, 408, 409, 235, 396, 410; 395/200.68, 200.71, 200.72, 200.73; 455/445

[56] References Cited

U.S. PATENT DOCUMENTS

| | | | |
|---|---|---|---|
| 5,051,987 | 9/1991 | Conlon | 370/255 |
| 5,163,045 | 11/1992 | Caram et al. | 370/60.1 |
| 5,233,604 | 8/1993 | Ahmadi et al. | 370/255 |
| 5,377,262 | 12/1994 | Bales et al. | 379/220 |
| 5,386,417 | 1/1995 | Daugherty et al. | 370/54 |
| 5,390,242 | 2/1995 | Bales et al. | 379/221 |
| 5,416,771 | 5/1995 | Iwata | 370/60 |
| 5,418,781 | 5/1995 | Kaufman et al. | 370/60 |
| 5,430,729 | 7/1995 | Rahnema | 370/409 |
| 5,521,910 | 5/1996 | Matthews | 370/406 |
| 5,537,392 | 7/1996 | Wille et al. | 370/406 |

OTHER PUBLICATIONS

ATM Forum 94–0471R3 "P–INN Draft Specification".
*National Communications System Technical Information Bulletin* 92–14, "Management of Stressed Facility Networks Level II Report Extension", Sep. 1992.
Bellcore Special Report SR–NWT–002514, Issue 1, Jan. 1993, "Digital Cross–Connect Systems in Transport Network Survivability".

*Primary Examiner*—Min Jung

[57] ABSTRACT

A setup procedure employing distributed hop-by-hop routing reduces the number of signaling messages needed to establish a service (i.e., connection), thus enhancing network performance. A service is setup between an origination node and a destination node which are a part of a network of communication nodes interconnected by links. Each node maintains a topological database representing the network topology. Initially, a setup message for initiating the service is transmitted from the origination node to a neighboring node that serves as a local node. The topological database is then updated after the local node receives the setup message by eliminating links connected to a particular set of nodes. This set of nodes includes those nodes other than the local node that have previously transmitted a setup or failure message for the service. A shortest path is next determined from the local node to the destination node over the updated topology and another setup message is transmitted from the local node to a first neighboring node in the shortest path. The previously-mentioned steps are repeated, beginning with the step of updating the topological database, where the neighboring node now serves as a subsequent local node. The steps are repeated until either a setup message reaches the destination node so that the service enters a connected state or no shortest path is found at the origination node, which indicates that the service has failed to enter a connected state.

7 Claims, 5 Drawing Sheets

| NEXT HOP | DISTANCE |
|---|---|
| Z | 1 |
| A | 3 |
| D | 4 |
| E | 5 |

FIG. 3

| SIGNALING MESSAGES SENT WITH DKSP ||||| 
|---|---|---|---|---|
| SEQ. | TYPE | FROM | TO | SETUP TRAIL |
| 1 | SETUP | A | B | A |
| 2 | FAILURE | B | A | A,B |
| 3 | SETUP | A | C | A,B |
| 4 | SETUP | C | D | A,B,C |
| 5 | SETUP | D | E | A,B,C,D |
| 6 | FAILURE | E | D | A,B,C,D,E |
| 7 | FAILURE | D | C | A,B,C,D,E |
| 8 | FAILURE | C | A | A,B,C,D,E |

FIG. 4

| SIGNALING MESSAGES SENT WITH THE INVENTIVE PROCEDURE |||||
|---|---|---|---|---|
| SEQ. | TYPE | FROM | TO | SETUP TRAIL |
| 1 | SETUP | A | B | A |
| 2 | FAILURE | B | A | A,B |
| 3 | SETUP | A | C | A,B |
| 4 | FAILURE | C | A | A,B,C |

| ONE LINK STATE SYSTEM | | |
|---|---|---|
| ALGORITHM | TOTAL NUMBER OF SERVICES RESTORED | PERCENT EFFICIENCY |
| DKSP | 12,110 | 91.23% |
| INVENTIVE PROCEDURE | 12,723 | 95.85% |

FIG. 6(b)

| TWO LINK STATE SYSTEM | | |
|---|---|---|
| ALGORITHM | TOTAL NUMBER OF SERVICES RESTORED | PERCENT EFFICIENCY |
| DKSP | 12,842 | 96.75% |
| INVENTIVE PROCEDURE | 13,058 | 98.38% |

FIG. 7

| SYSTEM | DKSP | THE INVENTIVE PROCEDURE | PERCENT REDUCTION |
|---|---|---|---|
| ONE LINK STATE | 13.33 | 12.36 | 7.28% |
| TWO LINK STATE | 12.54 | 11.53 | 8.05% |

FIG. 8(a)

| ONE LINK STATE SYSTEM | | | |
|---|---|---|---|
| MESSAGE TYPE | DKSP | THE INVENTIVE PROCEDURE | PERCENT REDUCTION |
| SETUP | 1,266,346 | 459,547 | 63.73 |
| FAILURE | 1,092,370 | 293,079 | 73.17 |

FIG. 8(b)

| TWO LINK STATE SYSTEM | | | |
|---|---|---|---|
| MESSAGE TYPE | DKSP | THE INVENTIVE PROCEDURE | PERCENT REDUCTION |
| SETUP | 944,524 | 343,148 | 63.67 |
| FAILURE | 774,903 | 186,386 | 75.95 |

ROUTING METHOD FOR SETTING UP A SERVICE BETWEEN AN ORIGINATION NODE AND A DESTINATION NODE IN A CONNECTION-COMMUNICATIONS NETWORK

FIELD OF THE INVENTION

The present invention relates generally to communication networks, and, in particular, to a method for setting up a service between an origination node and a destination node in communication networks.

BACKGROUND OF THE INVENTION

A communications network typically includes a collection of nodes interconnected by transmission lines known as links. One type of communications network is a connection-oriented communications network that employs either circuit switching or virtual circuit switching to establish a connection or service. A circuit switched network establishes a dedicated physical connection between nodes for the duration of the communication between an origination and a destination node. A setup procedure is required to establish the physical connection. In a virtual circuit switched network, a logical connection is established when exchanging packets between nodes. A setup procedure is also used to establish the logical connection prior to transferring the packets. In contrast to a so-called connectionless network, a virtual connection eliminates the need for performing a separate routing decision for each packet transferred between an origination and destination node once the circuit has been established. Accordingly, virtual circuits minimize the overhead required for transmitting packets in the network by allowing the use of a relatively short virtual circuit identification number in the header field of the packet rather than a longer destination address required in connectionless networks.

The set-up procedure for connection-oriented networks creates a service (real or virtual) by allocating and configuring resources of certain nodes and links in the network to establish a path between the origination and destination nodes. Most set-up procedures include the sub-procedures of routing, signaling and switching. Routing procedures select the best nodes and links for use in the service path. Signaling procedures coordinate the allocation of resources on nodes and links for the service. Switching procedures are used at nodes to form the real or virtual connections between links along the service path.

Setup procedures can be classified as either centralized or distributed. In a distributed procedure, all the nodes in the network are capable of performing the routing procedures. Nodes exchange signaling messages that are used to coordinate allocation of resources for the service and trigger switching procedures. A centralized setup procedure is coordinated by a central controller (CC), which makes all routing decisions. Messages are exchanged between the CC and network nodes to allocate resources and trigger switching procedures.

Distributed setup procedures employ various types of routing procedures including source routing and hop-by-hop routing. In source routing, the origination node determines the entire service path through the network. One form of source routing is defined by the Private Network-Network Interface (PNNI), which is specified in "ATM Forum 94-0471R9: P-NNI Draft Specification," June 1995. In hop-by-hop routing, each node, beginning with the origination node, determines the next node (or link) in the service path.

One example of hop-by-hop routing is the dynamic k-shortest path (DKSP) routing algorithm, which is discussed in the following references: Management of Stressed Facility Networks, Level II Report, Network Management of Stressed Intelligent Networks, National Communications System, Technical Information Bulletin 92-14 September 1992; and Bellcore Special Report SR-NWT-002514, Issue 1, Digital Cross-Connect Systems In Transport Network Survivability, January 1993.

Network performance as measured in terms of network efficiency and the time required to complete the setup procedure, is dependent on the effectiveness of the routing procedure that is employed. Ineffective routing procedures cause large numbers of signaling messages to be transmitted, resulting in longer setup times. Ineffective routing procedures may also cause the selection of suboptimal routes through the network, resulting in inefficient use of network resources.

SUMMARY OF THE INVENTION

In accordance with the present invention, a setup procedure employing distributed hop-by-hop routing is provided. The inventive procedure reduces the number of signaling messages needed to establish a service (i.e., connection), thus enhancing network performance. Network efficiency may also be increased by selecting routes through the network that are more nearly optimal. More particularly, the inventive method sets-up a service between an origination node and a destination node which are a part of a network of communication nodes interconnected by links. Each node maintains a topological database representing the network topology. Initially, a setup message for initiating the service is transmitted from the origination node to a neighboring node that serves as a local node. The topological database is then updated after the local node receives the setup message by eliminating links connected to a particular set of nodes. This set of nodes includes those nodes other than the local node that have previously transmitted a setup or failure message for the service. A shortest path is next determined from the local node to the destination node over the updated topology and another setup message is transmitted from the local node to a first neighboring node in the shortest path. The previously-mentioned steps are repeated, beginning with the step of updating the topological database, where the neighboring node now serves as a subsequent local node. The steps are repeated until either a setup message reaches the destination node so that the service enters a connected state or no shortest path is found at the origination node, which indicates that the service has failed to enter a connected state.

DETAILED DESCRIPTION

The following terminology relating to communication networks will be used herein to facilitate an understanding of the present invention. A network is a set of nodes interconnected by links. The network is a connection-oriented communications network that employs either circuit switching or virtual circuit switching. A link is a unidirectional or bidirectional transmission medium connecting two nodes. The available bandwidth of a link is divided into circuits. Each node is a real or virtual circuit switch whose function is to form connections between circuits. A node will be referred to as a local node when it is performing a particular function under discussion at that time. Node i is a neighbor of node j if there is a link from node j to node i. A link from local node i to node j is a local link of node i. A service is a connection between two end systems through which the systems communicate. A service path is formed by a sequence of circuits over which the service operates. The first node in the service path is the origination node and the last node is the destination node for the service. A setup procedure completes the service path from the end system at the origination node to the end system at the destination node so that the service enters a connected state. The setup procedure includes a routing process that selects the appropriate circuits forming the service path. The routing process works in coordination with setup and crankback, or failure, messages that constitute a part of various conventional signaling protocols. A setup message is sent from a local node to a neighboring node instructing the neighboring node to reserve the link (more particularly, a circuit in the link) and to continue the setup procedure. A failure message, commonly referred to as a crankback message, is sent from a local node to the neighboring node from which the setup message was received if the routing process fails at the local node, freeing the circuit between the local and neighboring nodes. A setup trail is included in both setup and failure messages listing every node from which a setup or failure message has been sent during the setup procedure.

In order to fully understand the distributed hop-by-hop routing technique of the present invention, it is instructive to first consider one known technique of this type that can be employed to determine the service path taken by a service traveling between nodes in a connection oriented network such as an asynchronous transfer mode (ATM) network or a digital cross-connect system (DCS) network. This technique is the dynamic K-shortest path technique (DKSP), details of which can be found in the previously mentioned references. The overall objective of the DKSP technique is to maintain a table of correct shortest paths to all destination nodes in the network. The setup procedure for the DKSP procedure begins at the origination node. For this purpose, routing tables are initially constructed and updated whenever there are topological changes in the network, as for example, when a node or link is added or deleted. Each node maintains a unique routing table for each potential destination node in the network. A local node has a routing table to a given destination node that consists of k entries corresponding to the k neighboring nodes of the local node. For each of the k neighboring nodes, the routing table lists the length of the shortest path to the destination node via that neighboring node. The shortest paths are determined by a k-shortest path algorithm. The k entries in the routing table are sorted by distance so that the neighboring node offering the shortest path to the destination node appears first in the table. For example, FIG. 2 shows the routing table for local node C to destination node Z with respect to the network shown in FIG. 1

When a service arrives at a local node the next node in the service path is determined by considering each entry in the routing table in sequence until the first entry is found that satisfies selected criteria. For example, these criteria typically require that the distance to the destination node through the neighboring node be finite in length and that the link to the neighboring node have the capacity to support the service. Most significantly, the local node will not send the service directly to a neighboring node that is listed in the setup trail. That is, a service will not be routed from the local node directly through a neighboring node that has previously sent a setup or failure message during the setup procedure. Once the appropriate neighboring node has been determined, a setup message is sent to that node and the service setup procedure continues. If no acceptable neighboring node is found, a failure message is sent to the previous node in the service path.

To calculate the entries in the routing tables, the DKSP procedure requires that each node be aware of the network topology (i.e., the network links and the length of each link). In the simplest situation the network topology would remain static regardless of either the type of service being routed or changes in the availability of links. However, the network topology may change for a variety of reasons. For example, the topology may differ from service to service because services may differ in priority, required bandwidth and setup mode, for example. Additionally, the topology may vary because of link failures, available bandwidths, processing loads, and time of day, for example. Each node must maintain different routing tables for each possible type of service. Ideally, each node would know the current status of all links in the network. In practice, such complete knowledge can be difficult to obtain because of the difficulties involved in transmitting status information to all the nodes, particularly when the status of the links may change between the time the information is transmitted and the time it reaches the nodes. Accordingly, in practice, each node is typically aware of the current availability of local links, but often unaware of the current availability on nonlocal links. For the remainder of this discussion, including the examples that follow, it will be assumed that each node has information concerning the physical topology of the network (i.e., the existence of all other nodes and links) and the availability of local links, but not the availability of nonlocal links. However, this assumption is for illustrative purposes only and the present invention is applicable to networks in which each node does have information concerning the status of nonlocal links.

Setup procedures such as DKSP use conventional signaling protocols that include setup and failure messages or their functional equivalents. Some of the known protocols used by DKSP as well as the present invention may include, without limitation, the Integrated Services Digital Network (ISDN) User Part (ISUP) of Signaling System 7 (SS7) and Broadband-ISUP (B-ISUP). Details concerning these protocols may be found, in the following references: ITU-T Draft Recommendations Q.2761, Q.2762, Q.2763, Q.2764, Broadband Integrated Services Digital Network (B-ISDN) - Signaling System No. 7 B-ISDN User Part (B-ISUP), September 1994; ITU-T Recommendations Q.761, Q.762, Q.763, Q.764, ISDN User Part (ISUP). These protocols may employ additional messages other than setup and failure messages to complete the service. However, these additional messages are well known and do not constitute a part of the invention and hence will not be discussed further.

Figure 1:
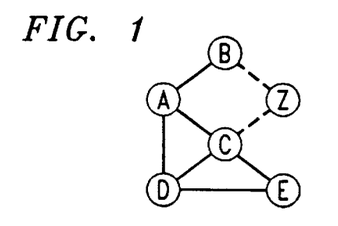
FIG. 1 illustrates the interconnection of an exemplary communication network having six nodes.
Figure 2:
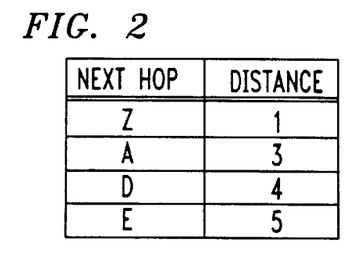
FIG. 2 shows a DKSP routing table for node C in FIG. 1 for routing a service to destination node Z.

The above-described DKSP routing procedure will be illustrated by showing the setup procedure for the network shown in FIG. 1 in which a service is to be routed from origination node A to destination node Z. The dashed links are busy and cannot support additional services at this time. (Obviously, the service is not going to reach the destination node since node Z is effectively isolated in the network.)

Figure 3:
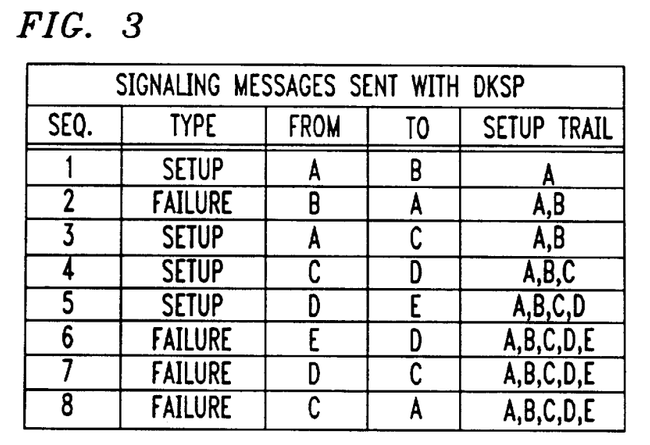
FIG. 3 shows the sequence of signaling messages transmitted during the known DKSP setup procedure for the network shown in FIG. 1 for a service attempting to be routed from node A to node Z.

FIG. 3 shows the sequence of signaling messages transmitted during the DKSP service setup procedure. First, origination node A sends a setup message to neighboring node B and node A is listed in the setup trail. Since node B knows the status of its local links it knows that the direct link to destination node Z is unavailable. The only other local link of node B is to node A, but a setup message cannot be sent to node A since it is listed in the setup trail. Accordingly, a failure message is sent to node A informing node A that the routing procedure has failed at node B. Node B now appears in the setup trail. Node A then sends a setup message to node C. As noted earlier, the routing table for node C to destination node Z is shown in FIG. 2. The first entry in the routing table is skipped since node C knows that the local link to node Z is busy. The second entry is also skipped since node A is listed in the setup trail. The third entry is acceptable, however, and a setup message is sent to node D. As FIG. 2 indicates, the distance to destination node Z via node D is 4 units. This distance is based on the four hop path C-D-A-B-Z. This path includes nodes A and B, which were previously visited during the setup procedure. Nodes A and B may be included in the path because as previously noted, the DKSP procedure only excludes neighboring nodes appearing in the setup trail; routing decisions may be based on service paths that will inevitably fail and which include other nodes that do appear in the setup trail as long as such nodes are not neighboring nodes. However, since routes through nodes A and B were previously attempted, this attempt to route the service through node D is also destined to fail. While the procedure does eventually fail, as FIG. 2 indicates, it does not do so until every node in the network (other than the origination and destination nodes) has received a setup message. This example illustrates the essential limitation of the DKSP procedure: the routing tables are based on a network topology that does not take into account that certain nodes have received, and possibly rejected, the service during previous steps in the setup procedure. That is, in the DKSP routing procedure, the shortest path calculations are performed before any service is even initiated.

In contrast to the DKSP routing procedure, the present invention continuously updates the network topology as the service is routed from node to node. Shortest path calculations are not performed until a given node receives the service. Upon receiving the service, the node updates the network topology and then calculates the shortest path to the destination node Z based on the updated topology. Since the inventive routing procedure performs shortest path calculations on the fly, it does not require routing tables that contain predetermined distances based on shortest path algorithms.

In accordance with the present invention, each local node performs two steps. First, the local node simplifies the network topology upon receiving the service by eliminating links connected to nodes that have previously transmitted a setup or failure message. More specifically, the local node eliminates all links from the network that are connected to a set of nodes consisting of all nodes listed in the setup trail except for the local node itself. By simplifying the topology in this manner, the inventive procedure recognizes that certain nodes have already been attempted and have either succeeded, in which case the service path already traverses that node, or alternatively, have failed. In contrast to the DKSP procedure, the inventive procedure does not inefficiently attempt to route a service via links that inevitably will not reach the destination node. After the network topology has been updated, the local node then calculates the shortest path to the destination node based on the updated, simplified topology.

Figure 4:
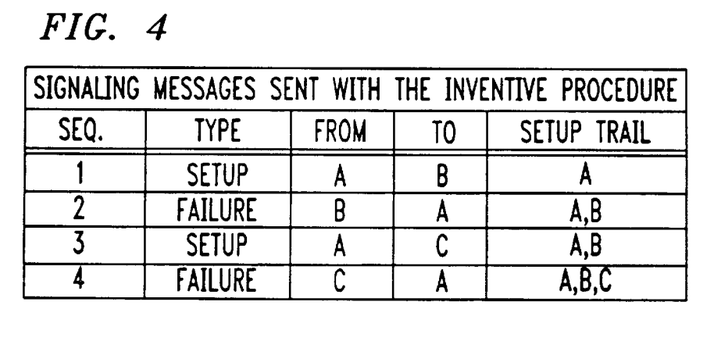
FIG. 4 shows the sequence of signaling messages transmitted during the setup procedure in accordance with the present invention for the network shown in FIG. 1 for a service attempting to be routed from node A to node Z.

FIG. 4 shows the sequence of signaling messages transmitted during the service setup procedure in accordance with the present invention for the network shown in FIG. 1. The sequence of messages is similar to the sequence used in the DKSP procedure until the service reaches node C. However, with the inventive procedure, node C first performs topology reduction upon receiving the service. Since nodes A and B appear in the setup trail and hence have been previously visited by the service, node C eliminates from the topology the links connected to nodes A and B. Once eliminated, node C performs a shortest path algorithm based on the updated network topology. Any appropriate shortest path algorithm known to those skilled in the art may be used. Since it is clearly impossible to reach destination node Z based on the updated topology, node C sends a failure message to node A, the origination node. At the origination node A, the topology is again updated (by removing all links connected to nodes B and C) and a new shortest path calculation is performed. This calculation fails to find a path to the destination node and thus the service fails. In contrast to the present invention, in the DKSP procedure node C sends a setup message to node D, without recognizing that a path through this node can only reach the destination node Z through nodes A and B, which have already been attempted. As a result, as FIGS. 3 and 4 indicate, the DKSP procedure must transmit eight messages before failing while the inventive procedure only transmits four.

Figure 5:
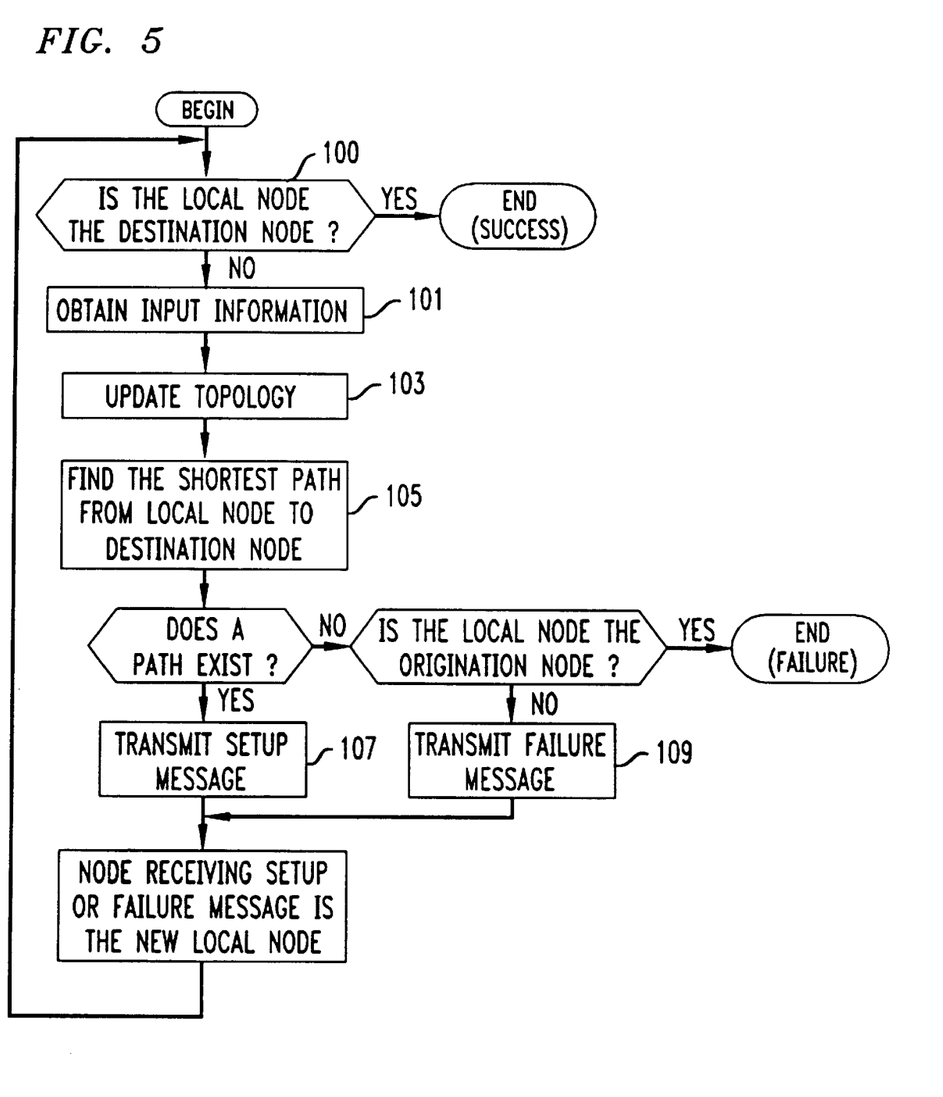
FIG. 5 shows a flow chart illustrating the steps performed by a local node in accordance with the present invention.

The inventive routing procedure will be further illustrated with reference to the flow chart shown in FIG. 5, which shows the procedure to be performed by each local node. The procedure is initiated at the origination node in response to a request to set up a service. First, in step 100 the local node is checked to see whether it is the destination node. If the local node is the destination node, the procedure is completed. If the local node is not the destination node, the procedure continues with step 101 in which input information is obtained. This information includes the node IDs of the destination node and the local node currently routing the service, the network topology, and the setup trail. The network topology may be represented as a list of link data structures. Each link data structure contains information regarding a link in the network available to the service and includes the link ID, the node IDs of the two nodes connected to the link, and the length of the link, which may be represented in terms of the relative cost for the service to use that link. The setup trail lists all the node IDs that have transmitted either a setup message or a failure message for the service.

In step 103 the local node updates the network topology by removing from the topology all link data structures representing a link connected to any node in a set of nodes, where the set of nodes consists of those nodes, other than the local node, that have previously transmitted a setup or failure message for the service. In step 105 a shortest path calculation is performed to find the shortest path from the local node to the destination node in the updated topology. If such a path is found then in step 107 a setup message is transmitted to the first neighboring node in the path. If no path is found and the local node is not the origination node, then in step 109 a failure message is transmitted to the neighboring node from which the local node received a setup message. Of course, if the local node is the origination node and no shortest path is found, the setup procedure ends in failure. If either a setup or failure message was transmitted, the procedure begins again at step 100 where the local node is now the neighboring node that received the message. That is, the neighboring node updates the topology and calculates a new shortest path. The procedure continues until it either fails at the origination node or succeeds when a setup message reaches the destination node. Depending on the particular signaling protocol used, the service may enter a connected state once a setup message reaches the destination node. Alternatively, some protocols require the transmission of additional messages such as an acknowledgment back to the origination node before the service is placed in a connected state.

While the example presented above in connection with the network shown in FIG. 1 illustrates the efficiency that can be achieved with the inventive routing procedure, potential inefficiencies may also exist because it is computationally intensive relative to the DKSP routing procedure. The number of computations is increased because the inventive routing procedure performs a shortest path calculation each and every time a node routes a service and hence many more calculations may be required than in the DKSP routing procedure. However, the inventor has determined through a computer simulation that for a network having 314 nodes and 542 links (and which is described in greater detail below) the additional processing contributes less than 10 percent to the total time required to process the setup and failure messages. This increased processing time resulted in only a 2 percent increase over the time needed to complete end-to-end signaling procedures. Furthermore, for many networks the actual service connection time is not even limited by the speed of the signaling system but rather by the time it takes a switch to make circuit connections.

Figure 6A:
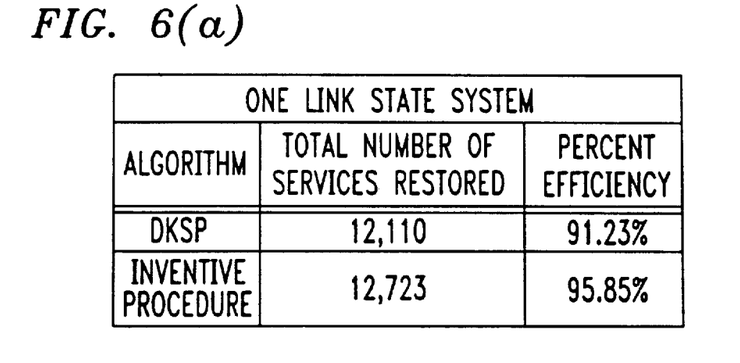
FIGS. 6(a) and 6(b) are computer simulated results showing the efficiencies of the DKSP procedure and the routing procedure in accordance with the present invention.
Figure 6B:
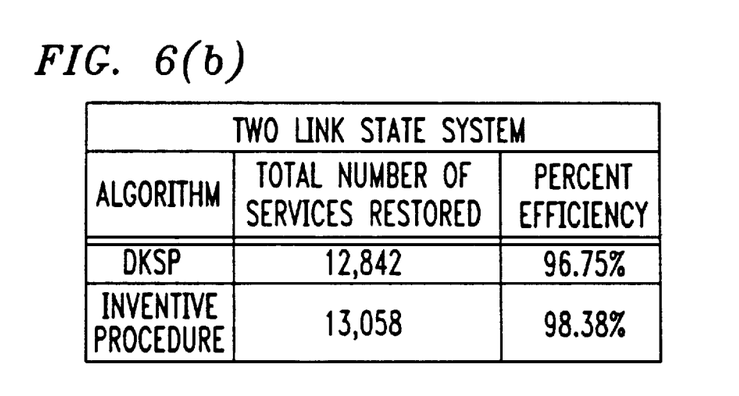

The following data comparing DKSP to the inventive routing procedure were obtained from the previously mentioned computer simulation. The simulations model a DCS restoration system that uses software running on a 486-DX2 66 MHz PC to perform and/or coordinate failure detection, signaling, routing, switching, and topology update functions. Shortest path calculations for both DKSP and the inventive procedure were based on a simple hop count metric. The inter-node signaling channel speed was modeled at 500 kbps. In total 82 separate node and link failures were simulated. FIGS. 6(*a*) and 6(*b*) show the efficiencies of the routing procedures measured in terms of the number of services successfully restored after a failure for a one link state and a two link state system, respectively. In a one link state system each node only knows about the existence of non-local links; it does not have information concerning the availability or failure of non-local links. In a two link state system each node knows via a link state update protocol whether non-local links are in-service or in a failed state. As FIG. 6 indicates, the efficiency of the inventive procedure is improved over the DKSP procedure.

Figure 7:
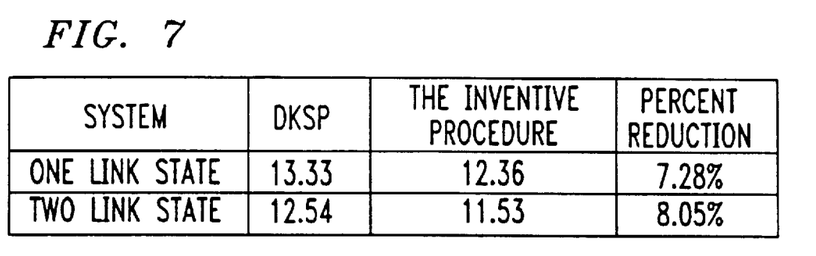
FIG. 7 are computer simulated results showing the average path lengths for all services routed by the DKSP procedure and the routing procedure in accordance with the present invention.

FIG. 7 compares the average path lengths of all services restored by the inventive procedure and the DKSP procedure for both one and two link state systems. For these systems, the inventive procedure reduces the amount of network resources used by each service by about seven to eight percent.

Figure 8A:
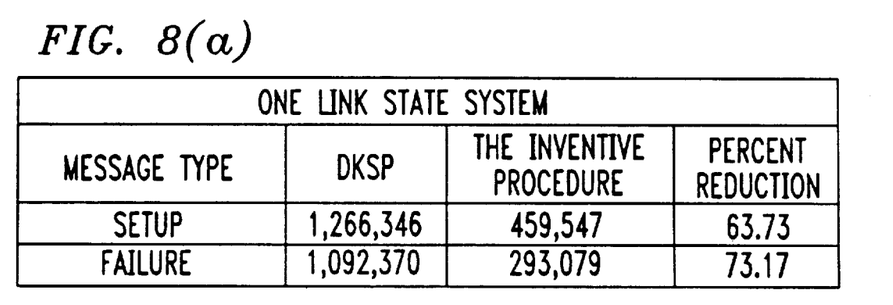
FIG. 8(a) and 8(b) are computer simulated results showing the total number of internode signaling messages exchanged by the DKSP procedure and the routing procedure in accordance with the present invention.
Figure 8B:
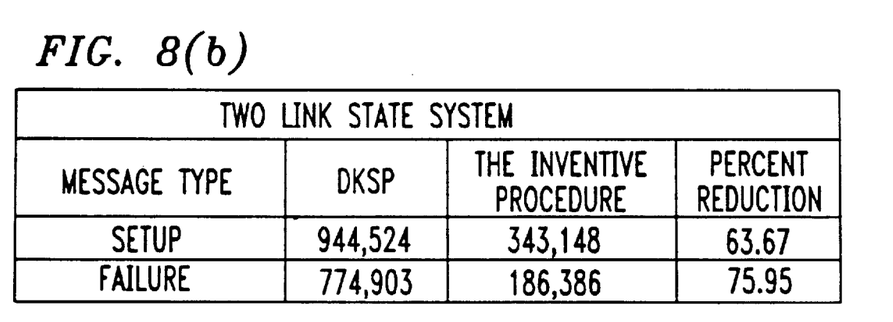

FIG. 8 compares the total number of internode signaling messages exchanged in all of the 82 simulated failures for the inventive procedure and DKSP for both one and two link state systems. For both systems, the inventive procedure reduces the required number of messages by over 60 percent.

Figure 9A:
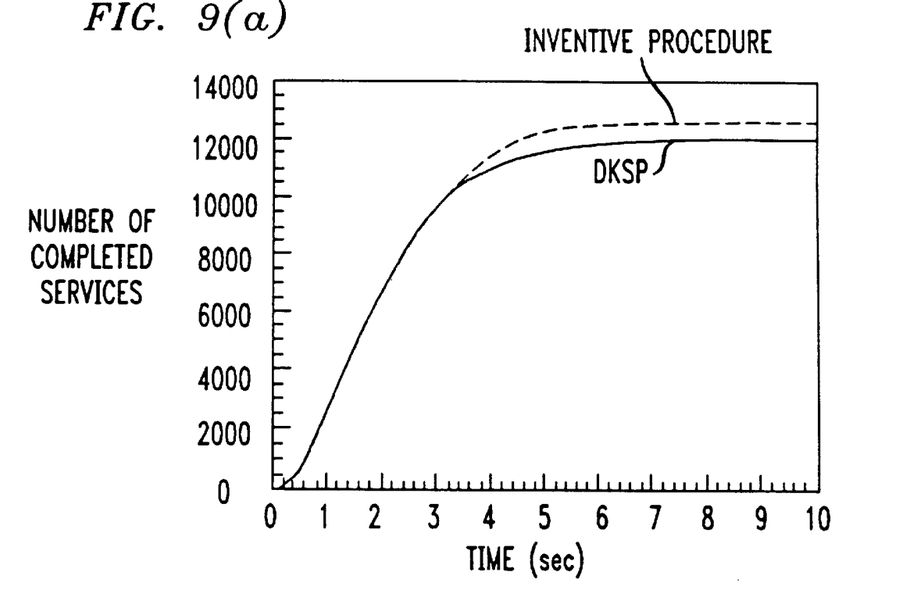
FIGS. 9(a) and 9(b) are computer simulated results showing the service completion times for the DKSP procedure and the routing procedure in accordance with the present invention.
Figure 9B:
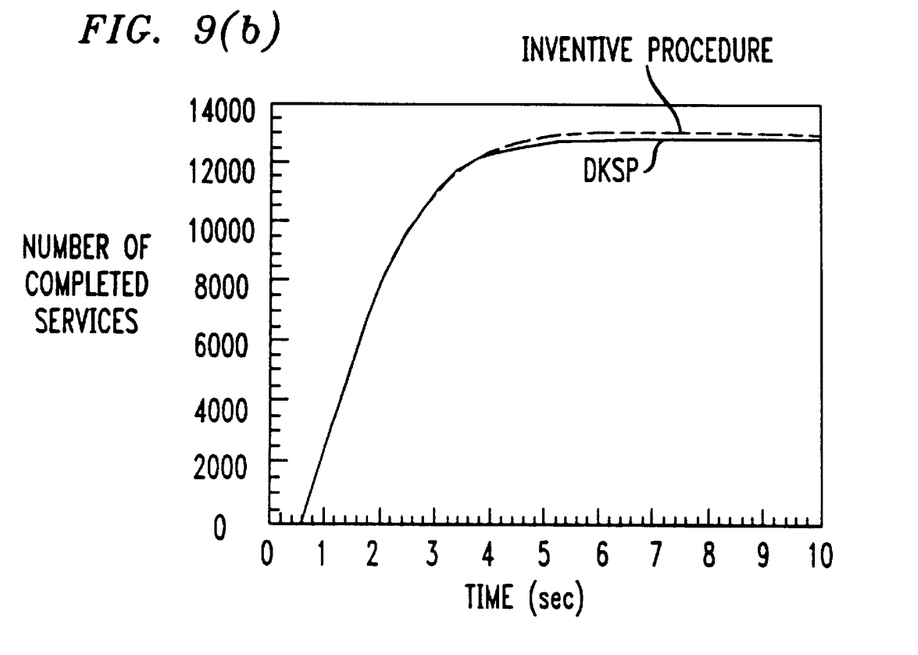

FIGS. 9(*a*) and 9(*b*) show the service completion time for the inventive procedure and DKSP for one and two link state systems, respectively. The service completion time is the time period beginning with the network failure and ending when the origination node receives an address complete message (ACM). An ACM is a type of acknowledgment message that is sent back along the service path by the destination node after it receives a setup message. The curves for the inventive procedure slightly lag the DKSP curves for the first few seconds. This lag amounts to about a 2 percent increase in service completion time for a typical service. After about three to four seconds however the curves cross and the DKSP procedure lags as the inventive procedure reaches higher efficiencies.

I claim:

1. A method for setting-up a service between an origination node and a destination node, said origination and destination nodes being a part of a network of communication nodes interconnected by links, said nodes maintaining a topological database representing a network topology, said method comprising the steps of:

a. transmitting a setup message for initiating the service from the origination node to a local node;

b. updating the topological database of said local node after the local node receives said setup message by eliminating links connected to a set of nodes, said set of nodes including those nodes in said network of communication nodes other than the local node that have previously transmitted a setup or failure message for said service;

c. determining a shortest path from the local node to the destination node over the updated topology;

d. transmitting another setup message from the local node to a neighboring node in the shortest path;

e. repeating steps b–d with said neighboring node serving as a subsequent local node until either a setup message reaches the destination node so that said service enters a connected state or no shortest path is found at said origination node indicating that said service has failed to enter a connected state.

2. The method of claim 1 further comprising the steps of:

f. returning a failure message from a local node to a previous node if no shortest path is found in step (c);

g. returning to step (b) and repeating steps (b)–(e), wherein a link connected to said local node returning the failure message in step (f) is eliminated from the topological database in accordance with step (b).

3. The method of claim 1 wherein step (e) includes the step of transmitting an acknowledgment message from the destination node to the origination node prior to said service entering the connected state.

4. The method of claim 1 further comprising the step of associating with each node in the network a database containing identification information concerning other nodes in said network, links in said network and the respective lengths thereof.

5. The method of claim 4 wherein the lengths of the links are expressed in terms of relative cost.

6. The method of claim 4 wherein each setup message and each failure message received by each node further includes information concerning nodes that have previously transmitted a setup or failure message for said service.

7. The method of claim 1 wherein step (a) includes the step of performing a shortest path calculation from the origination node to the destination node to determine the local node that receives the setup message from the origination node.

* * * * *